US012277787B2

(12) United States Patent
Yu et al.

(10) Patent No.: US 12,277,787 B2
(45) Date of Patent: *Apr. 15, 2025

(54) CONTENT EXTRACTION BASED ON GRAPH MODELING

(71) Applicant: PAYPAL, INC., San Jose, CA (US)

(72) Inventors: Xiaodong Yu, Singapore (SG); Hewen Wang, Singapore (SG)

(73) Assignee: PAYPAL, INC., San Jose, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 18/300,131

(22) Filed: Apr. 13, 2023

(65) Prior Publication Data

US 2023/0260302 A1    Aug. 17, 2023

Related U.S. Application Data

(63) Continuation of application No. 17/077,211, filed on Oct. 22, 2020, now Pat. No. 11,657,629.

(51) Int. Cl.
*G06V 30/18* (2022.01)
*G06F 16/901* (2019.01)
(Continued)

(52) U.S. Cl.
CPC .... *G06V 30/18181* (2022.01); *G06F 16/9024* (2019.01); *G06F 18/214* (2023.01);
(Continued)

(58) Field of Classification Search
CPC ....... G06V 30/18181; G06V 30/18162; G06V 30/18; G06V 30/1444; G06V 30/10; G06V 30/148; G06V 30/41; G06V 30/414; G06V 30/42; G06V 10/464; G06V 10/457; G06V 10/451; G06V 10/22; G06F 16/9024; G06F 18/214; G06F 18/2337; G06F 16/583; G06F 16/5846; G06F 16/5838; G06F 16/5854; G06F 16/5862; G06N 3/04; G06N 3/02; G06N 3/0464; G06N 3/0475; G06N 3/0495; G06N 3/0499; G06N 3/042;
(Continued)

(56) References Cited

U.S. PATENT DOCUMENTS 5,410,611 A * 4/1995 Huttenlocher ....... G06V 30/146
382/177
8,905,303 B1 12/2014 Ben Ayed
(Continued)

*Primary Examiner* — Oneal R Mistry
*Assistant Examiner* — Duy Tran
(74) *Attorney, Agent, or Firm* — Haynes and Boone, LLP

(57) ABSTRACT

Methods and systems are presented for extracting categorizable information from an image using a graph that models data within the image. Upon receiving an image, a data extraction system identifies characters in the image. The data extraction system then generates bounding boxes that enclose adjacent characters that are related to each other in the image. The data extraction system also creates connections between the bounding boxes based on locations of the bounding boxes. A graph is generated based on the bounding boxes and the connections such that the graph can accurately represent the data in the image. The graph is provided to a graph neural network that is configured to analyze the graph and produce an output. The data extraction system may categorize the data in the image based on the output.

20 Claims, 8 Drawing Sheets

(51) Int. Cl.
  *G06F 18/214* (2023.01)
  *G06N 3/04* (2023.01)
  *G06Q 10/083* (2024.01)
  *G06Q 10/0833* (2023.01)
  *G06Q 20/40* (2012.01)
  *G06V 10/22* (2022.01)
  *G06V 10/44* (2022.01)
  *G06V 10/46* (2022.01)
  *G06V 30/14* (2022.01)
  *G06V 30/10* (2022.01)

(52) U.S. Cl.
  CPC ........... *G06N 3/04* (2013.01); *G06Q 10/0833* (2013.01); *G06Q 10/0838* (2013.01); *G06Q 20/407* (2013.01); *G06V 10/22* (2022.01); *G06V 10/457* (2022.01); *G06V 10/464* (2022.01); *G06V 30/1444* (2022.01); *G06V 30/10* (2022.01)

(58) Field of Classification Search
  CPC ........... G06Q 10/0833; G06Q 10/0838; G06Q 20/407; G06Q 20/409; G06Q 2250/905
  See application file for complete search history.

(56) References Cited

U.S. PATENT DOCUMENTS

| | | |
|---|---|---|
| 2007/0058856 A1 | 3/2007 | Boregowda et al. |
| 2008/0173706 A1* | 7/2008 | Skaaksrud ............ G06Q 10/08 235/375 |
| 2008/0255863 A1 | 10/2008 | Mack et al. |
| 2012/0106787 A1* | 5/2012 | Nechiporenko ..... G06V 30/424 382/103 |
| 2019/0171870 A1 | 6/2019 | Vajda et al. |
| 2019/0251402 A1* | 8/2019 | Godwin, IV .......... G06F 18/285 |
| 2020/0151546 A1* | 5/2020 | Liu ....................... G06F 18/214 |

* cited by examiner

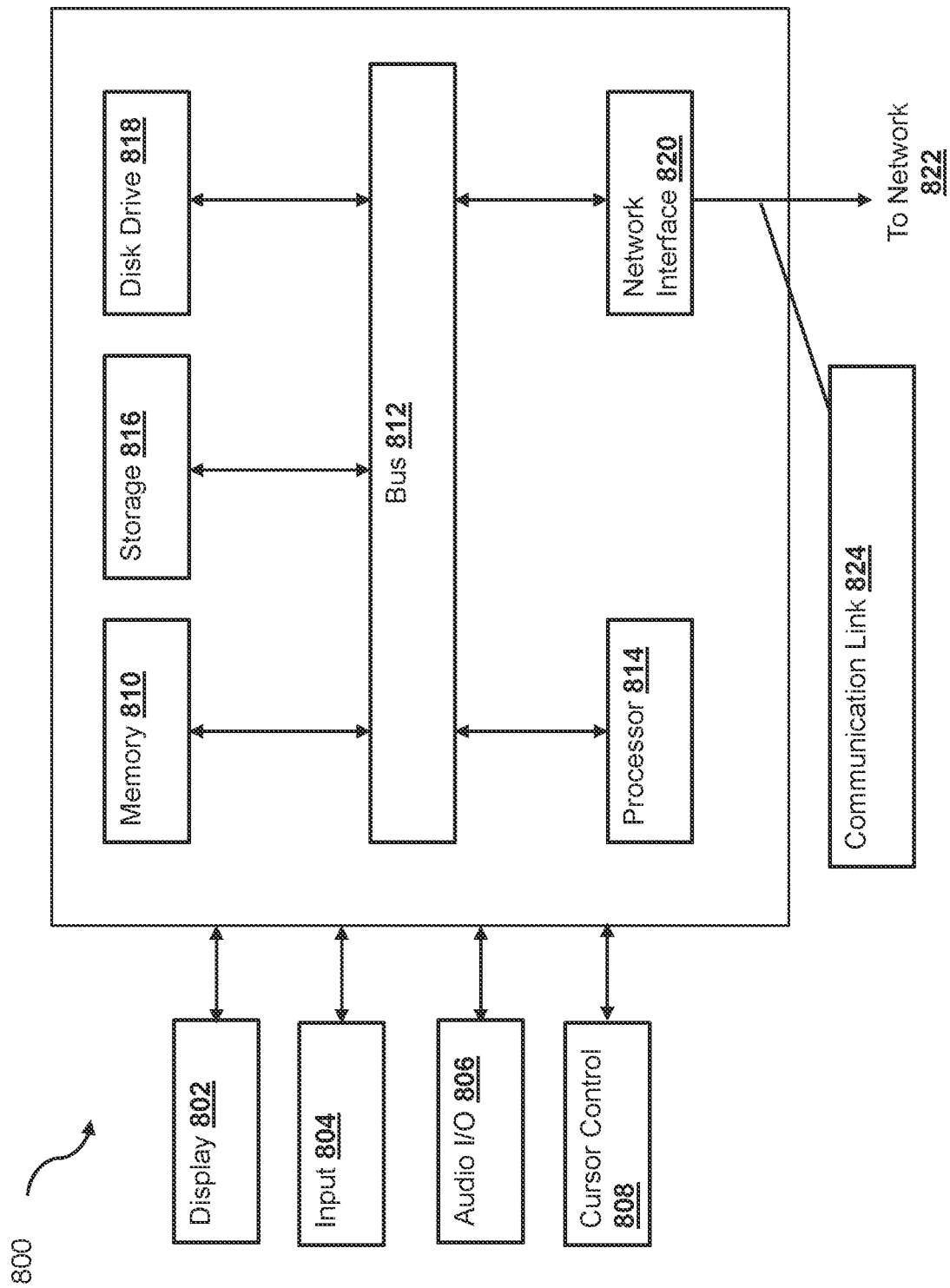

CONTENT EXTRACTION BASED ON GRAPH MODELING

CROSS REFERENCE TO RELATED APPLICATION

The present invention is a Continuation of U.S. patent application Ser. No. 17/077,211, filed Oct. 22, 2020, which is incorporated herein by reference in its entirety.

BACKGROUND

The present specification generally relates to image-based content extraction, and more specifically, to extracting content from an image based on graph modeling according to various embodiments of the disclosure.

RELATED ART

Image recognition techniques have evolved rapidly in recent years. For example, various optical character recognition (OCR) techniques have been developed that enable text (e.g., characters, words, numerals, etc.) to be easily extracted from images. While characters and numerals can be identified within an image using the OCR techniques, transforming the identified characters and numerals to useful information remains a challenge.

Certain image recognition applications rely on patterns of the character arrangement (e.g., alpha-numeric arrangements, etc.) and surrounding objects identified within the image to map different character combinations (e.g., alphabets, numerals, special characters, etc.) to different information types. For example, when certain characters (e.g., "STOP") are identified within a post sign (e.g., a red hexagon post sign) in an image, an image recognition application may determine that the characters describe the post sign, and thus, may determine that the sign is a stop sign based on the identified characters. In another example, when a nine-digit number is identified next to the letters "SSN," the image recognition application may infer that the nine-digit number corresponds to a social security number. However, some information type may not correspond to a consistent pattern (e.g., shipment tracking numbers for different couriers, identification numbers for different organizations, etc.), and an image that includes the data may not include other recognizable objects for identifying the information type of the data. Thus, there is a need for developing advanced techniques in extracting content from images.

BRIEF DESCRIPTION OF THE FIGURES

FIG. 8 is a block diagram of a system for implementing a device according to an embodiment of the present disclosure.

Figure 1:
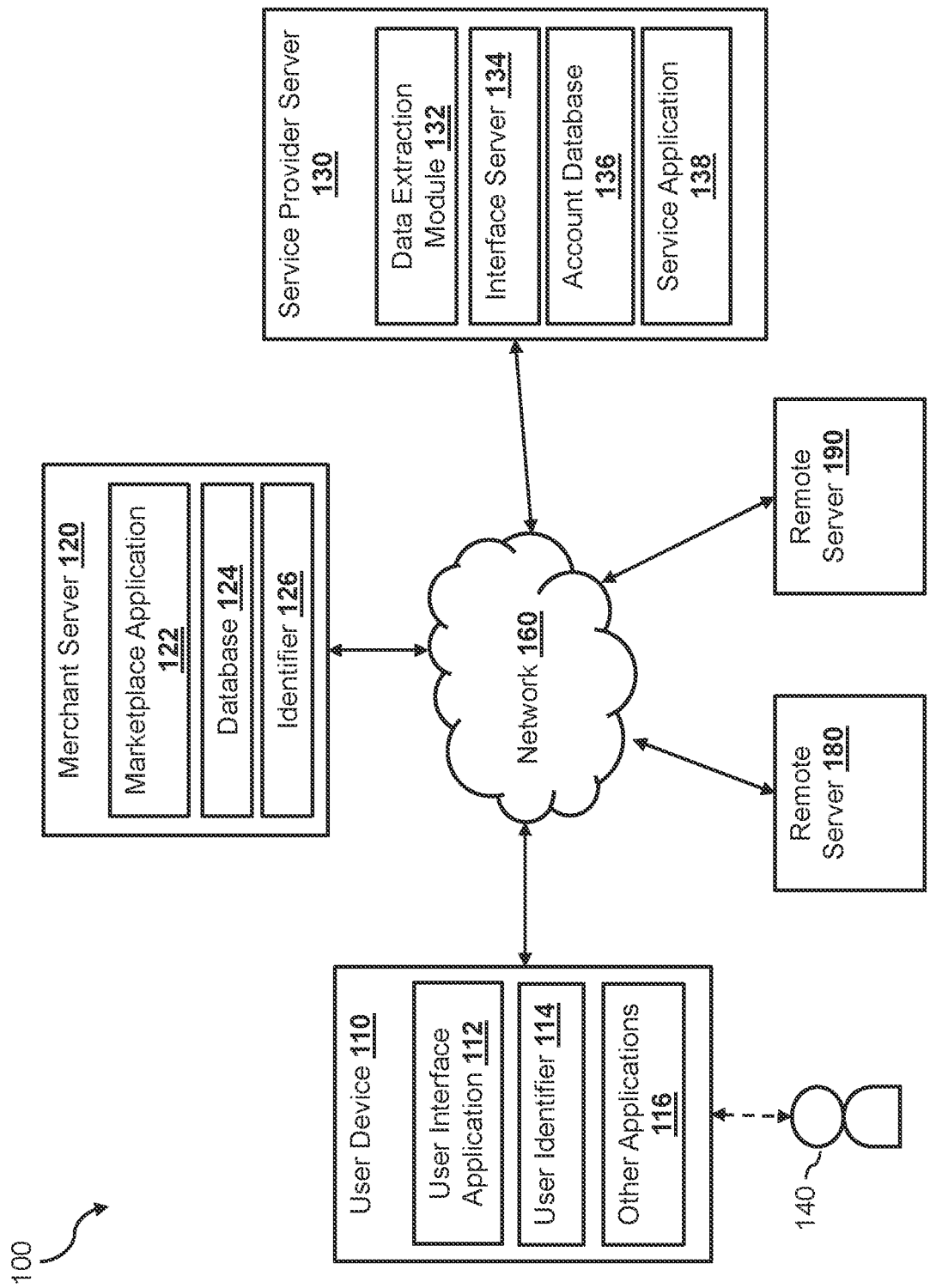
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for extracting categorizable information, data, or content from an image using a graph that models data within the image. As discussed above, conventional image recognition applications rely on recognizable patterns to categorize data identified within an image. In some embodiments, upon receiving an image, the image recognition application may first use optical character recognition (OCR) technique(s) to identify characters (e.g., alphabets, numerals, special characters, etc.) that appear within the image. The image recognition application may then use one or more known patterns to determine which data type corresponds to the identified characters. For example, the image recognition application may store a pattern corresponding to a social security number, which is a nine-digit numeral in the arrangement of '###-##-####,' where each symbol '#' denotes a numeral. Thus, when the image recognition application recognizes a group of nine numerals that follows the arrangement of '###-##-####' in the image, the image recognition application may determine that the group of nine numerals corresponds to a social security number.

In another example, the image recognition application may store another pattern corresponding to a California license plate number, which is a group of seven alpha-numeric characters in the arrangement of '#@@@###,' where each symbol '#' denotes a numeral and each symbol '@' denotes an alphabetic letter. Thus, when the image recognition application recognizes a group of seven alpha-numeric characters that follows the arrangement of '#@@@###' in the image, the image recognition application may determine that the group of seven alpha-numeric characters corresponds to a California license plate number.

However, while certain data types have a consistent recognizable pattern, this may not be the case for all data types. For example, tracking numbers of shipments from different couriers (e.g., FedEx®, UPS®, United States Postal Services, DHL®, etc.) may follow a large number of different alpha-numeric arrangements (e.g., formats) since each courier may generate their tracking numbers under different formats. To exacerbate the problem, the couriers may change the formats from time to time, making it challenging to identify a tracking number based on existing patterns alone. Furthermore, an image that includes the tracking number (e.g., an image of a shipping label) may include other data that are not tracking numbers, but may look like a tracking number (e.g., other texts that follow the same or substantially the same format as a tracking number).

As such, according to various embodiments of the disclosure, a data extraction system may extract categorizable content from an image by using a graph that is generated to model the data within the image. By analyzing the graph that models the data within the image, a data extraction system may take into account positions of different data that appear in the image, relationship of each data with respect to other data within the image, and other aspects of the data within the image that would not have been available to the data extraction system if only each piece of data in the image is analyzed (e.g., whether the data corresponds to a pattern) in isolation.

In some embodiments, upon receiving an image, the data extraction system may first identify text (e.g., strings of characters) within the image. For example, the data extraction system may use one or more OCR techniques to identify characters (alphabets, numerals, special characters that are not alphabets or numerals, etc.) that appear in the image. In some embodiments, the data extraction system may also use one or more decoding algorithms to decode symbols or codes (e.g., a bar code, a Quick Response (QR) code, etc.) that appear in the image. The data extraction system may determine text based on decoding the symbols or codes in the image and replace the symbols or codes with the text in the image.

After identifying text within the image, the data extraction system may group the identified text into different groups. In some embodiments, the data extraction system may group the identified texts into different groups based on different factors, such as spacing between the adjacent characters, orientations of the characters, font attributes (e.g., font types, font sizes, font colors, etc.) of the characters, and other characteristics. For example, the data extraction system may measure the distances between each pair of adjacent characters identified in the image. The data extraction system may group characters in the same group when it is determined that the spacing between the adjacent characters is consistent (e.g., within a threshold deviation such as 5%, 10%, etc.) and is within a threshold distance. The threshold distance may be determined in proportion to the font size of the characters (e.g., 5%, 20%, etc.) of the width of the font size. In other words, the data extraction system may group adjacent characters in different groups when the spacing between two adjacent characters is larger than the threshold distance, or when the spacing is drastically different from (e.g., substantially larger such as larger than a threshold) the spacing with a neighboring character.

The data extraction system may also use the orientation of the characters to group the characters. For example, the data extraction system may group characters that have different orientations (e.g., vertical, horizontal, etc.) in different groups. The data extraction system may also use the font attributes (e.g., font size, font type, etc.) to group the characters such that characters having different font attributes (e.g., a different font type, a different font size, etc.) are grouped into different groups by the data extraction system.

In some embodiments, the data extraction system may generate a bounding box for each group of characters identified in the image. The bounding box may be an imaginary boundary that encloses the text (e.g., the characters) determined to be within the same group on the image. The bounding box may have a pre-defined shape (e.g., a rectangle, an oval, etc.) and may be defined by the width and height of the text within the group.

The data extraction system may then analyze each of the bounding boxes within the image and may determine features for each of the bounding boxes. In some embodiments, the features determined for each bounding box may include a location of the bounding box within the image (e.g., one or more pixel locations of pixels corresponding to the bounding box, such as one or more corners of the bounding box, a center of the bounding box, etc.), a size of the bounding box (e.g., the dimensions of the bounding box, a pixel count of the bounding box, etc.), one or more distances with one or more neighboring bounding boxes, and characteristics of the texts enclosed within the bounding box, such as a font type, a font size, a font color, a spacing between characters in the bounding box, and other text characteristics.

In some embodiments, the data extraction system may also analyze the text within each bounding box to determine an arrangement of the text. The arrangement may indicate a ratio between alphabetic letters and numerals within the text, whether any special characters exist in the text, and a particular alpha-numeric order within the text. Based on the arrangement, the data extraction system may determine whether the text corresponds to any known format, such as a date format, a zip code format, etc. The data extraction system may also include the arrangement of the text and information indicating whether any format and/or which format corresponds to the text as the features of the bounding box.

In some embodiments, the data extraction system may generate connections between adjacent bounding boxes within the image. For example, the data extraction system may generate, for each bounding box in the image, at least one connection with a neighboring bounding box (e.g., another bounding box that is closest to the bounding box in the image). In some embodiments, since it is common for texts within a document to appear in a particular direction (e.g., left to right, top to bottom, etc.), the data extraction system may divide the bounding boxes within the image into rows of bounding boxes, where each row of bounding boxes is along the direction of the texts. The data extraction system may then connect neighboring bounding boxes in the same row. The data extraction system may also connect each bounding box to at least one other bounding box in an adjacent row (e.g., in the row above the bounding box, in the row below the bounding box, etc.). Each generated connection between a pair of bounding boxes may include data such as a distance between the pair of bounding boxes within the image and an orientation of the connection (e.g., a relative angle of the connection from the direction of the text, etc.). In some embodiments, instead of connecting each bounding box in the image to the nearest bounding box in the next row (or previous row), the data extraction system may connect each bounding box to another bounding box in a direction that is substantially perpendicular to a dominant direction of the text in the image (e.g., substantially perpendicular, such as within 10%, within 20%, etc., to the rows of bounding boxes). For example, the data extraction system may determine that the majority (e.g., more than 50%, 60%, 80%, etc.) of the text within the image appears to be in a particular direction (e.g., from left to right, from top to bottom, etc.), text within the image. The data extraction system may determine that the particular direction is the dominant direction of the text within the image.

After generating the connections among the bounding boxes in the image, the data extraction system may construct a graph based on the bounding boxes and the features of the bounding boxes. In some embodiments, the data extraction system may construct the graph by creating a node for each bounding box created in the image and creating an edge between two nodes based on a connection generated between two corresponding bounding boxes. Thus, each node in the graph may correspond to a distinct bounding box in the image. Each node in the graph may include attributes associated with the corresponding bounding box, such as the features determined for the bounding box. Thus, each node in the graph may include information such as a location of the bounding box in the image, a size of the bounding box, and characteristics of the texts within the bounding box.

The data extraction system may also create an edge in the graph based on each connection generated between two bounding boxes in the image. Thus, each edge in the graph that connects two nodes may correspond to a connection generated between two corresponding bounding boxes. Each edge may also include attributes associated with the corresponding connection, such as a distance between the two connected bounding boxes and an orientation of the connection.

The data extraction system may then categorize at least one group of text (e.g., text within a bounding box) in the image based on the corresponding node in the constructed graph. In some embodiments, the data extraction system may categorize the group of text based on a structure of the graph, the position of the corresponding node in the graph, attributes of the corresponding node, attributes of the edges connected to the corresponding node, and attributes of other nodes in the graph connected to the corresponding node. In some embodiments, the data extraction system may use a graph neural network to determine a category (e.g., a label, a data type, etc.) associated with the group of texts. The graph neural network may be a graph recurrent network. The graph neural network may be configured to accept a graph (e.g., all of the attributes associated with the nodes and the edges in the graph) as inputs and produce an output based on different aspects of the graph as a whole. For example, the structure of the graph, positions of the nodes within the graph, and edges among different nodes can all be taken into account by the graph neural network to produce the output.

In some embodiments, the data extraction system may train the graph neural network to produce an output that indicates which node in the graph corresponds to a particular category (e.g., a particular label, a particular data type, etc.) and/or a probability (e.g., a percentage) that a particular node corresponds to the particular category. In one example, the category may correspond to a tracking number used by a shipping courier. Thus, the data extraction system may use images of historic shipment labels (where locations of the tracking numbers have been identified) to train the graph neural network. To train the graph neural network, the data extraction system may determine bounding boxes within each training image, generate a graph based on the bounding boxes in each training image, label the node in the graph that corresponds to the particular category (e.g., a tracking number), and provide the labeled graph to the graph neural network.

After training the graph neural network, the data extraction system may use the trained graph neural network to determine which corresponding node is associated with the particular category. For example, the data extraction system may use the output from the graph neural network to determine which node corresponds to the particular category (e.g., a shipment tracking number). The data extraction system may extract the text from the corresponding bounding box from the image. In some embodiments, the data extraction system may also verify the extracted text using known patterns associated with the particular category (e.g., tracking number patterns). The data extraction system may then provide the extracted texts in the form of a tracking number on a user device.

In some embodiments, the data extraction system may be part of a payment service provider system that facilitates payments of purchase transactions. After the payment service provider system has processed a purchase transaction between a user and a merchant, the payment service provider system may receive an image of a shipping label from the merchant as a proof of shipment. In order to verify and check the shipment status of the shipment associated with the purchase transaction, the payment service provider system may use the data extraction system to extract a tracking number of the shipment. The payment service provider system may then access a third-party server (e.g., a shipping courier server) using an application programming interface (API) call associated with the third-party server to determine a shipment status of the shipment based on the tracking number that the data extraction system has extracted from the image using the techniques disclosed herein. In some embodiments, the payment service provider system may determine which third-party server (e.g., selecting a shipping courier server from multiple different shipping courier servers corresponding to different shipping couriers) to track the shipment status based on a format (e.g., an alphanumeric arrangement) of the tracking number.

The payment service provider system may perform further action(s) based on the shipping status. For example, the payment service provider system may transmit the shipping status of the shipment (e.g., estimated arrival date, etc.) to a user device of the user (e.g., the buyer in the purchase transaction). In some embodiments, when the payment service provider system determines that the shipment has an error (e.g., the tracking number is invalid, the estimated delivery date is beyond a date threshold for the shipment, etc.), the payment service provider system may perform an action to the accounts of the user and the merchant (e.g., to refund the amount from the merchant account to the user account, etc.).

FIG. 1 illustrates an electronic transaction system 100, within which the data extraction system may be implemented according to one embodiment of the disclosure. Note that the present techniques may be applied in many different computing and technological environments, however, and are not limited to those shown in the figures. The electronic transaction system 100 includes a service provider server 130, a merchant server 120, remote servers 180 and 190, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via websites hosted by, or mobile applications associated with, the merchant server 120 respectively. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

In various implementations, the user 140 is able to input data and information into an input component (e.g., a keyboard) of the user device 110. For example, the user 140 may use the input component to interact with the digital wallet application 112 (e.g., to add a new funding account, to provide information associated with the new funding account, to initiate an electronic payment transaction, etc.).

While only one user device 110 is shown in FIG. 1, it has been contemplated that multiple user devices, each associated with a different user, may be connected to the merchant server 120 and the service provider server 130 via the network 160.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

Each of the remote servers 180 and 190, in one embodiment, may be maintained by a third-party data source entity associated with a shipping courier (e.g., FedEx®, UPS®, United States Postal Services, etc.). Note that in other embodiments, remote servers 180 and 190 may be associated with other entities that may benefit from various features discussed herein, such as entities that generate data accessible and useful to service provider server 130. Each of the remote servers 180 and 190 may maintain data associated with shipments processed by the corresponding shipping courier. For example, each of the remote servers 180 and 190 may store, for each shipment that has been processed by the corresponding shipping courier, data associated with the shipment such as a tracking number associated with the shipment, information about the items being shipped (e.g., a size, a weight, an item description, etc.), a shipment method (e.g., priority first class, priority air, 2-day air, ground, etc.), a status of the shipment (e.g., processed, on route, delivered, etc.), an estimated delivery date, and other information associated with the shipment. In some embodiments, each of the remote servers 180 and 190 may provide a corresponding API that enables other devices, such as user device 110, the merchant server 120, and the service provider server 130 to access the data associated with one or more shipment. For example, the user device 110, the merchant server 120, and/or the service provider server 130 may provide to a remote server (using a corresponding API call) a tracking number associated with a shipment. Based on the tracking number, the remote server may retrieve data associated with a shipment that is identified by the tracking number. The remote server may then return to the requesting device the data associated with the shipment (e.g., a shipment status, an estimated arrival date, etc.).

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140 or a merchant associated with the merchant server 120, etc.) may access a user account associated with the user and access various services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a data extraction module 132 that implements the data extraction system as discussed herein. The data extraction module 132 may be configured to extract categorizable information using techniques described herein. In one example, the data extraction module 132 may be configured to extract a tracking number from an image of a shipping label. For instance, the service provider server 130 may process a purchase transaction between the user 140 of the user device 110 and the merchant server 120. The purchase transaction may include a shipment of one or more items (e.g., products that the user 140 purchased from the merchant associated with the merchant server 120). The purchase transaction may specify certain requirements for the shipment, such as a shipping courier used, a shipment method (e.g., 2-day air, ground, etc.), an estimated delivery date, etc. The merchant may initiate a shipment with a shipping courier based on the requirements and may submit a proof of the shipment to the service provider server 130. In some embodiments, the proof of the shipment may be in the form of an image of a shipping label associated with the shipment. The service provider server 130 may then use the data extraction module 132 to extract a tracking number from the image using the techniques disclosed herein.

After obtaining the tracking number, the service provider server 130 may transmit the tracking number to the user device 110, such as by presenting the tracking number on the user device 110 via an interface generated by the interface server 134 and/or communicating the tracking number to the user device 110 via one or more communication protocols (e.g., email, short message system (SMS), etc.). In some embodiments, the service provider server 130 may also access data associated with a shipment identified by the tracking number from one of the remote servers 180 and 190. For example, based on a format (e.g., an alpha-numeric arrangement, a length, etc.) of the tracking number and/or based on information provided by the merchant, the service provider server 130 may determine a shipping courier associated with the shipment. The service provider server 130 may then submit a shipment data request to one of the remote servers 180 and 190 corresponding to the shipping courier (e.g., using an API call associated with the remote server).

The service provider server 130 may receive shipment data associated with the shipment as a response from the remote server. The shipment data may include information such as a status of the shipment (e.g., on route, processed, delayed, delivered, etc.), an estimated arrival date, a shipment method (e.g., 2-day air, ground, etc.), a size and a weight of the shipment package, and other information. In some embodiments, the service provider server 130 may transmit the shipment information along with the tracking number to the user device 110.

In some embodiments, the service provider server 130 may analyze the shipment information to determine whether the shipment information satisfies one or more requirements of the purchase transaction. For example, the user 140 and the merchant may agree on certain shipment terms for the purchase transaction, such as a shipment method, an estimated arrival date, etc. Thus, the service provider server may determine whether the shipment data indicates a shipment method that is the same or better (e.g., faster) than the shipment method required by the purchase transaction and an estimated arrival date is the same or sooner than the arrival date required by the purchase transaction. In some embodiments, the service provider server 130 may also determine whether the size and weight of the package indicated in the shipment data is consistent with the product(s) being purchased in the purchase transaction.

When the service provider server 130 determines that the shipment data is not consistent with the requirements of the purchase transaction or that the service provider server 130 receives an error as a response to the shipment data request (e.g., which may indicate that the tracking number is invalid), the service provider server 130 may perform an action associated with the account of the merchant and/or the account of the user 140. For example, the service provider server 130 may automatically initiate a dispute transaction for the purchase transaction on behalf of the user 140 for the purchase transaction. The service provider server 130 may also transmit a notification to the merchant server 120 indicating the inconsistencies between the shipment data and the purchase transaction.

In some embodiments, the service provider server 130 may withhold an amount associated with the purchase transaction from the merchant account (e.g., the amount being withdrawn from a user account of the user 140) until the service provider server 130 determines that the product(s) associated with the purchase transaction has been successfully shipped based on the shipment data. Thus, only after the service provider server 130 determines that the shipment has been shipped (e.g., the shipping status indicating that the shipment is on route), the service provider server 130 would release the amount and transfer the amount to the merchant account.

Figure 2:
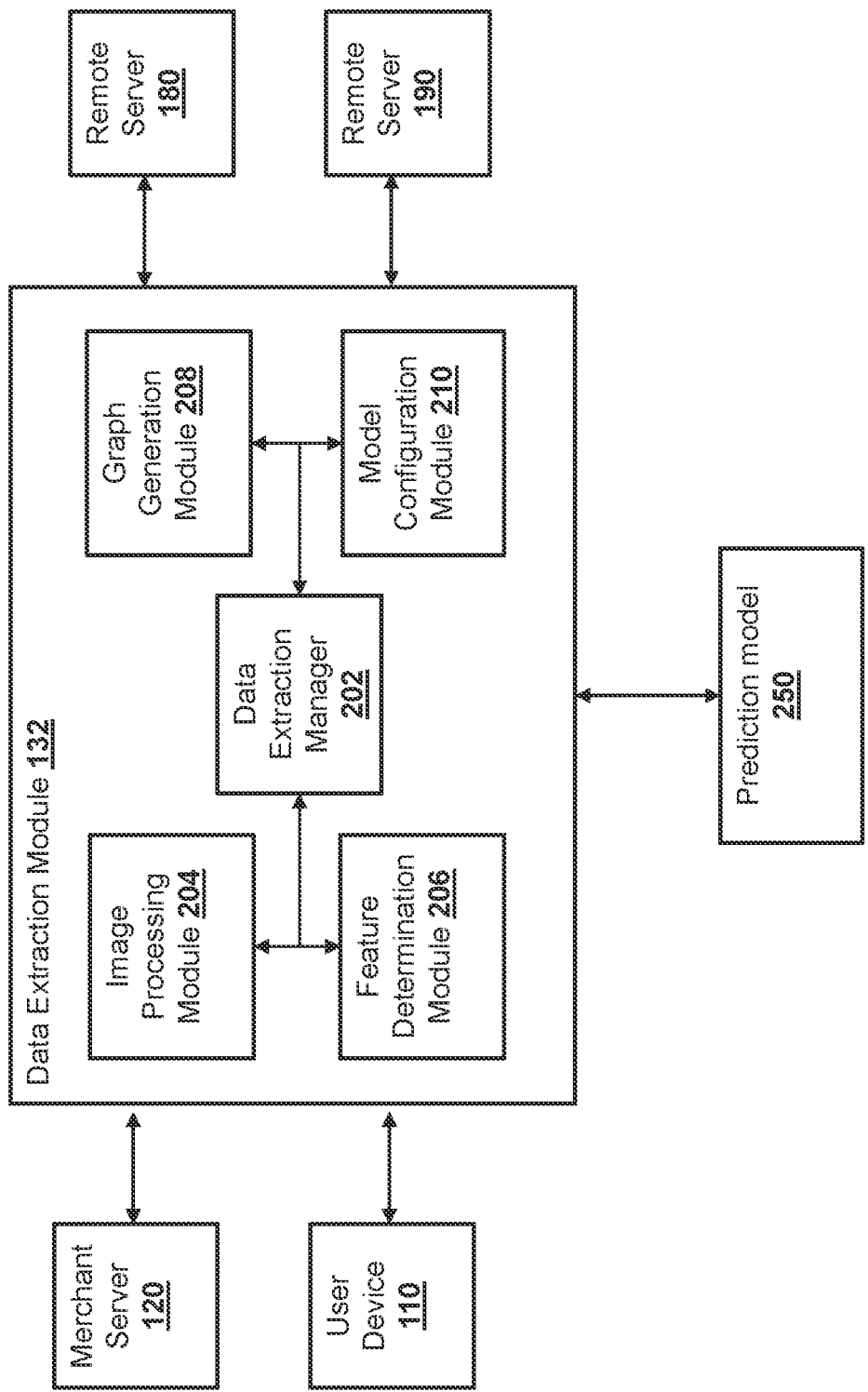
FIG. 2 is a block diagram illustrating a data extraction module according to an embodiment of the present disclosure.

FIG. 2 illustrates a block diagram of the data extraction module 132 according to an embodiment of the disclosure. The data extraction module 132 includes a data extraction manager 202, an image processing module 204, a feature determination module 206, a graph generation module 208, and a model configuration module 210. As discussed herein, the data extraction module 132 of some embodiments is configured to extract categorizable information from an image. In one example, the data extraction module 132 may be used by the service provider server 130 to extract tracking numbers from images of shipping labels. Thus, after the service provider server 130 has processed the purchase transaction between the user 140 and the merchant associated with the merchant server 120, the data extraction manager 202 of the data extraction module 132 may obtain an image of a shipping label from the merchant server 120 or the user device 110 in connection with the purchase transaction. The data extraction manager 202 may obtain the image as part of a request by the service provider server 130 to extract a tracking number from the image.

Upon receiving an image, the image processing module 204 of the data extraction module 132 may perform one or more pre-processing on the image, such as rotating the image to a correct orientation, de-skewing the image, applying one or more filters to the image to sharpen the details and remove noise within the image, etc. The image processing module 204 may then identify text (e.g., characters such as alphabets, numerals, and other special characters that are non-alphabet and non-numeral, etc.) within the image. In one example, the image processing module 204 may use one or more OCR techniques to recognize or otherwise identify characters that appear in the image. In some embodiments, in addition to recognize text that appears in the image, the image processing module 204 may also determine if any code (e.g., bar codes, QR codes, etc.) appears in the image. The image processing module 204 may attempt to translate the code that appears in the image into text (a string of characters) and may replace the code with the text in the image.

Figure 3:
FIG. 3 illustrates an example image of a shipping label according to an embodiment of the present disclosure.

FIG. 3 illustrates an example of an image 300 of a shipping label associated with the purchase transaction. As shown, the image 300 includes different sections (that are made up of text and/or code) corresponding to different types of information. For example, the section 302 includes text associated with information of a sender of the shipment, which includes a name, a phone number, and an address of the sender. The section 304 includes text associated with a ship date of the shipment, an invoice number (labeled as "CAD") for the shipment, a payor for the shipment (indicated as the sender in this example), and a weight of the package. The section 306 includes text associated with information of a receiver of the shipment, which includes a name, an address, and a phone number of the receiver. Sections 308 and 312 include different bar codes that may contain information of the shipment. Section 310 includes a tracking number of the shipment.

While it may be easy for a human to spot a tracking number within the image 300, it can be a challenge for a computer to automatically determine that the text in the section 310 corresponds to a tracking number, because the image 300 includes large amounts of text, and some of the text include strings of characters in different areas of the image 300 that are undecipherable by the data extraction module 132, such as the invoice number in the section 304, which can be mistaken as a tracking number. As mentioned above, using a pattern-based algorithm to identify a tracking number in the image 300 of a shipping label may produce an inaccurate result as the format (an alpha-numeric arrangement, a length) of tracking numbers may vary and may be changed by the courier from time to time. It has been contemplated that the graph-based algorithm for identifying a tracking number within the image 300 as disclosed herein would produce more accurate result than the pattern-based algorithm.

In some embodiments, after identifying text within the image 300, the feature determination module 206 may group the identified text into different groups. In some embodiments, the feature determination module 206 may initially group all of the text identified in the image 300 as a single group, and may then separate the text into different groups based on different factors, such as spacing between the adjacent characters, orientations of the characters, font attributes (e.g., font types, font sizes, font colors, etc.) of the characters, and other characteristics.

Since it is common for a document to have a dominant orientation that aligns with the direction of the majority (e.g., over 50%, 80%, etc.) of the text (e.g., left to right, top to bottom, etc.), the feature determination module 206 may first determine a dominant orientation of the shipping label. The feature determination module 206 may then determine, for each character identified in the image 300, character characteristics such as a direction relative to the orientation of the shipping label, a font type, a font size, and a font color, and distances (e.g., can be measured in a number of pixels) between the character and adjacent (e.g., neighboring) characters. The feature determination module 206 may first assume all of the characters identified within the image as part of the same group.

The feature determination module 206 may then begin dividing the characters into different groups based on the factors as discussed herein. For example, the feature determination module 206 may divide characters that are in different directions (e.g., different orientations) into different groups. The feature determination module 206 may also divide different portions of characters into different groups based on the spacing between the different portions of characters (e.g., the spacing is larger than a threshold, the spacing between two characters is larger than the spacing between neighboring characters by a threshold deviation, etc.). In some embodiments, the spacing threshold may be determined in proportion to the font size of the characters (e.g., 5%, 20%, etc.) of the width of the font size. Furthermore, the feature determination module 206 may also divide portions of characters into different groups when the portions of characters have different character characteristics (e.g., different font sizes, different font types, different font colors, etc.).

After dividing the identified text into different groups of characters, the feature determination module 206 may generate bounding boxes for the different groups of characters. In some embodiments, the feature determination module 206 may generate a bounding box for each group of characters identified in the image. The bounding box may be an imaginary boundary that encloses the text (e.g., the characters) within a group on the image. The bounding box may have a pre-defined shape (e.g., a rectangle, an oval, etc.) and may be defined by the width and height of the text within the group. The bounding box may have a dynamic shape that is based on characteristics of the text within a group in the image.

Figure 4:
FIG. 4 illustrates generation of bounding boxes in the image of a shipping label according to an embodiment of the present disclosure.

FIG. 4 illustrates example bounding boxes that are generated for different groups of text on the image 300. As shown in this example, each of the bounding boxes are generated as a rectangular shape that encloses the characters within a corresponding group. For example, the feature determination module 206 may determine that the text "ORIGIN:QEFA" and the adjacent text "(123)456-7890" on the top of the image 300 belongs to different groups based on the spacing between the last character 'A' of the text "ORIGIN:QEFA" and the first character '(' of the text "(123)456-7890" is much larger than the spacing between the adjacent characters (e.g., the characters 'F' and 'A' in the text "ORIGIN:QEFA" and the characters '(' and '1' in the text "(123)456-7890." As such, the feature determination module 206 may generate a bounding box 402 for enclosing the text "ORIGIN:QEFA" and another bounding box 404 for enclosing the text "(123)456-7890."

The feature determination module 206 may also generate a bounding box 406 that encloses the group of characters "JIANYU SHU" as the feature determination module 206 determines that the text "JIANYU SHU" belongs to a different group than other adjacent text on the image. The feature determination module 206 may determine that the text "TO" and the neighboring text "JANELLE" belong to different groups because of the different font sizes used for the text "TO" and the text "JANELLE." Thus, the feature determination module 206 generates a bounding box 408 for the text "TO" and a bounding box 410 for the text "JANELLE." Based on spacing and character characteristics, the feature determination module 206 may determine other groups of characters on the image 300, and create bounding boxes 412-426 for the different groups of characters on the image 300. It is noted that while only the bounding boxes 402-426 are shown in FIG. 4 for illustration, the feature determination module 206 of some embodiments may generate additional bounding boxes for other groups of characters identified on the image 300.

The feature determination module 206 may then analyze each of the bounding boxes 402-426 within the image 300, and may determine features for each of the bounding boxes 402-426. In some embodiments, the features determined for each bounding box may include a location of the bounding box within the image 300 (e.g., one or more pixel locations of pixels corresponding to the bounding box, such as one or more corners of the bounding box, a center of the bounding box, etc.), a size of the bounding box (e.g., the dimensions of the bounding box, a pixel count of the bounding box, etc.), one or more distances with one or more neighboring bounding boxes, and characteristics of the texts enclosed within the bounding box, such as a font type, a font size, a font color, a spacing between characters in the bounding box, and other text characteristics.

In some embodiments, the feature determination module 206 may also analyze the text within each of the bounding boxes 402-426 to determine an arrangement of the text. The arrangement may indicate a length of the text within the bounding box, a ratio between alphabets and numerals within the text, whether any special characters exist in the text, and a particular alpha-numeric order within the text. Based on the arrangement, the feature determination module 206 may determine whether the text corresponds to any known format, such as a date format, a zip code format, etc. The feature determination module 206 may also include the arrangement of the text and information indicating whether any format and/or which format corresponds to the text as the features of the bounding box.

In some embodiments, the data extraction module 132 may generate a graph that models the data in the image 300 based on the bounding boxes 402-426. The graph may represent characteristics of the text included in the image 300, and also the relative positions of each group of characters from other groups. In some embodiments, the graph generation module 208 may construct the graph by first creating a node for each bounding box in the image 300. Thus, each node in the graph may correspond to a distinct bounding box in the image 300. The graph generation module 208 may also include the features of each bounding box determined by the feature determination module 206 as attributes in a corresponding node in the graph.

In order to construct edges among the nodes in the graph that represent the relationships among the bounding boxes in the image 300, the graph generation module of some embodiments may use one or more techniques to connect the bounding boxes in the image 300. In some embodiments, the graph generation module 208 may connect, for each bounding box in the image 300, all of its neighboring bounding box. For example, the graph generation module 208 may, for each bounding box in the image 300, determine all of the surrounding bounding boxes (e.g., adjacent bounding box(es) in any direction from the bounding box).

In some embodiments, before connecting the bounding boxes in the image 300, the graph generation module 208 may divide the text in the image 300 into different rows of text based on the orientation of the image 300 (the orientation being determined based on the dominant direction of the text in the image 300). Each row of text is aligned along an imaginary line across the dominant direction of the text. Referring back to FIG. 4, the graph generation module 208 may determine that the dominant direction of the image 300 is from left to right based on the direction of the text in the image 300. The graph generation module 208 may then determine that the bounding boxes 402 and 404 are in the same row, the lone bounding box 406 is in another row, the bounding boxes 408-412 are in another row, the bounding box 414 is in another row, the bounding boxes 416-422 are in another row, and the bounding boxes 424-426 are in another row.

The graph generation module 208 may then, for each bounding box in the image 300, connect the bounding box with neighboring bounding box(es) (e.g., to the left and to the right, etc.) within the same row of text. For example, the graph generation module 206 may connect the bounding box 402 to the bounding box 404 since they are adjacent to each other in the same row. Similarly, the graph generation module 206 may connect the bounding box 410 with the bounding boxes 408 and 412 since the bounding boxes 408 and 412 are adjacent to the bounding box 410 in the same row. The graph generation module 208 may also connect the bounding box 418 to the adjacent bounding boxes 416 and 420 in the same row, and may connect the bounding box 420 to the adjacent bounding boxes 418 and 422 in the same row. Lastly, the graph generation module 208 may connect the bounding box 424 with the bounding box 426 since the bounding boxes 424 and 426 are adjacent to each other in the same row.

The graph generation module 208 may also, for each bounding box in the image 300, connect the bounding box to the nearest bounding boxes in the adjacent rows (e.g., to the top and to the bottom, etc.). For example, the graph generation module 208 may connect the bounding box 402 to the bounding box 406 from the next row. The graph generation module 208 may also connect the bounding box 404 to the bounding box 406 as the bounding box 406 is the nearest bounding box to the bounding box 404 in the next row. Similarly, the graph generation module 208 may connect each of the bounding boxes 408, 410, and 412 to the bounding box 406 (from the row above) and to the bounding box 414 (from the row below). The graph generation module 208 may also connect each of the bounding boxes 416, 418, 420, and 422 to the bounding box 414 (from the row above), connect the bounding box 416 to the bounding box 424 (the nearest bounding box in the row below), and connect each of the bounding boxes 418, 420, and 422 to the bounding box 426 (the nearest bounding blow in the row below).

In some embodiments, instead of connecting each bounding box in the image 300 to the nearest bounding box in the next row (or the previous row), the graph generation module 208 may connect each bounding box to another bounding box in a direction that is substantially perpendicular to the dominant direction of the text in the image 300. For example, instead of connecting the bounding box 404 to the bounding 406 (the bounding box in the next row below), the graph generation module 208 may connect the bounding box 404 to the bounding box 412 instead.

Thus, using the techniques described herein, each bounding box may be connected to at least one other bounding box and at most four bounding boxes in the image 300. The graph generation module 208 may then construct the edges in the graph based on the connections among the bounding boxes 402-426. In some embodiments, the graph generation module 208 may create an edge in the graph for each connection generated between two bounding boxes in the image 300. Thus, each edge in the graph that connects two nodes may correspond to a connection generated between two corresponding bounding boxes in the image 300. Each edge in the graph may also include attributes associated with the corresponding connection, such as a distance between the two connected bounding boxes and an orientation of the connection (e.g., an angle with respect to the dominant direction of the text in the image 300).

Figure 5:
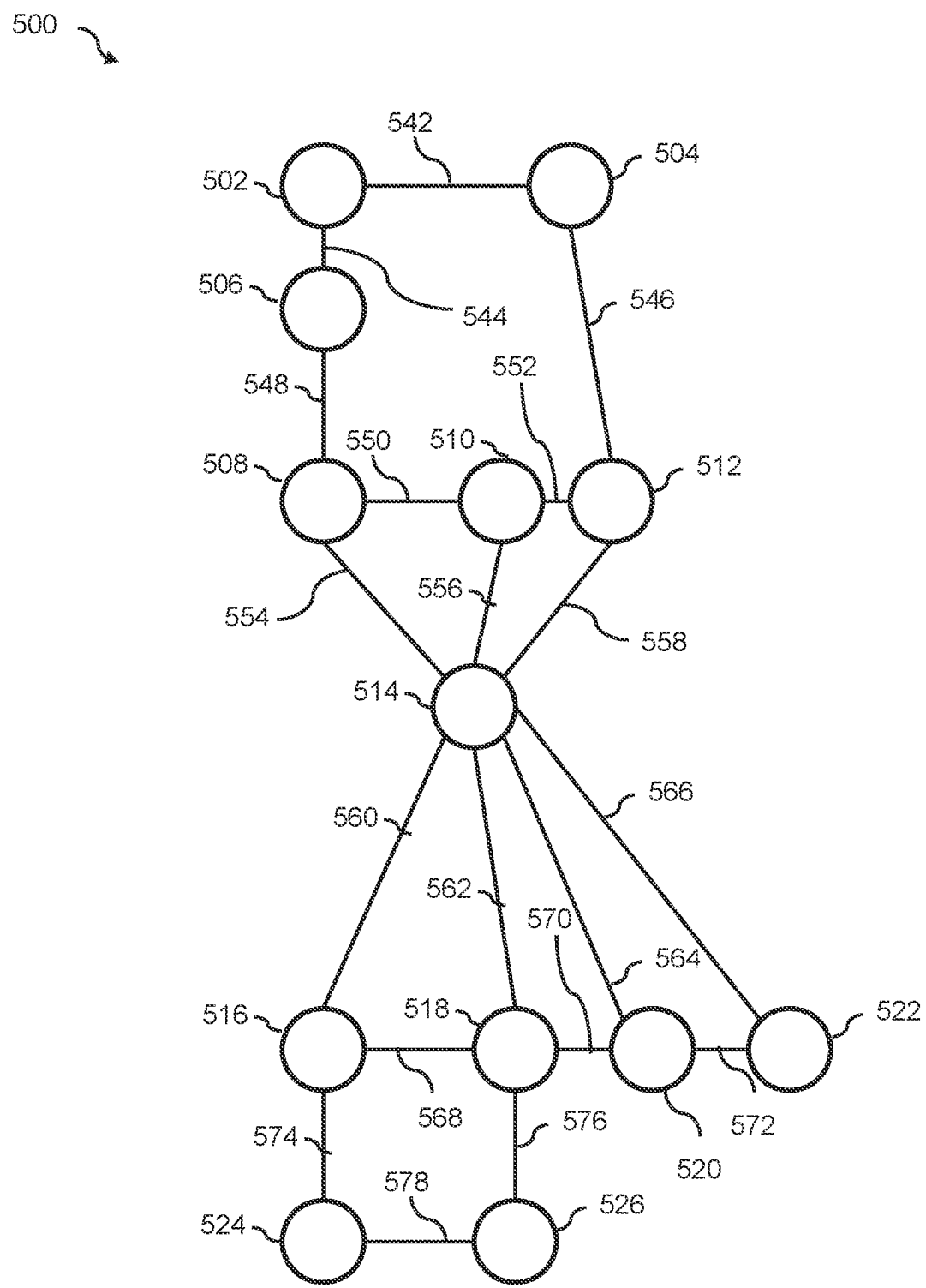
FIG. 5 illustrates an example graph generated based on the bounding boxes in an image according to an embodiment of the present disclosure.

FIG. 5 illustrates an example graph 500 generated by the graph generation module 208 based on the bounding boxes 402-426 in the image 300. As shown, the graph 500 includes nodes 502-526 and edges 542-578. In this example, the nodes 502-526 in the graph 500 are generated to correspond to the nodes 402-426, respectively. Each of the edges 542-578 connecting two nodes in the graph 500 is generated to represent a connection connecting two corresponding bounding boxes in the image 300. For example, the edge 542 connecting the nodes 502 and 504 represents the connection between the bounding boxes 402 and 404. The edge 544 connecting the nodes 502 and 506 represents the connection between the bounding boxes 402 and 406. The edge 546 connecting the nodes 504 and 512 represents the connection between the bounding boxes 404 and 412. The edge 548 connecting the nodes 506 and 508 represents the connection between the bounding boxes 406 and 408. The edge 550 connecting the nodes 508 and 510 represents the connection between the bounding boxes 408 and 410. The edge 552 connecting the nodes 510 and 512 represents the connection between the bounding boxes 410 and 412. The edges 554, 556, and 558 connecting the nodes 508, 510, and 512 to the node 514 represents the connections between the bounding box 414 to each of the bounding boxes 408, 410, and 412. The edges 560, 562, 564, and 566 connecting the nodes 516, 518, 520, and 522 to the node 514 represents the connections between the bounding box 414 to each of the bounding boxes 416, 418, 420, and 422.

The edge 568 connecting the nodes 516 and 518 represents the connection between the bounding boxes 416 and 418. The edge 570 connecting the nodes 518 and 520 represents the connection between the bounding boxes 418 and 420. The edge 572 connecting the nodes 520 and 522 represents the connection between the bounding boxes 420 and 422. The edge 574 connecting the nodes 516 and 524 represents the connection between the bounding boxes 416 and 424. The edge 576 connecting the nodes 518 and 526 represents the connection between the bounding boxes 418 and 426. The edge 578 connecting the nodes 524 and 526 represents the connection between the bounding boxes 424 and 426. Since all of the nodes 502-526 include attributes that represent the corresponding bounding boxes (e.g., the locations and sizes of the bounding boxes, distances from other bounding boxes, etc.) and characteristics of the text enclosed within the bounding boxes (e.g., font types, font sizes, font colors, alpha-numeric arrangements, lengths, etc.), and all of the edges include attributes that represent the corresponding connections (e.g., distances, between the two connected bounding boxes, an orientation of the connection, such as an angle with respect to the dominant direction of the text in the image 300, etc.), the graph 500 accurately and comprehensively represents the data in the image 300.

The data extraction manager 202 may then categorize at least one group of characters (e.g., text within a bounding box) in the image 300 based on the corresponding node in the constructed graph 500. In some embodiments, the data extraction manager 202 may categorize the group of characters based on a structure of the graph 500, the position of the corresponding node in the graph 500, attributes of the corresponding node, attributes of the edges connected to the corresponding node, and attributes of other nodes in the graph 500 connected to the corresponding node. In some embodiments, the data extraction manager 202 may use a prediction model 250 for predicting a category for the group of characters. The prediction model 205 may be implemented as a graph neural network, such as a graph recurrent network. In some embodiments, the model configuration module 210 may configure the prediction model 250 to accept a graph (e.g., all of the attributes associated with the nodes and the edges in the graph) as inputs and produce an output based on different aspects of the graph as a whole. For example, the structure of the graph, positions of the nodes within the graph, and edges among different nodes are analyzed by the prediction model 250 to produce the output.

In some embodiments, the model configuration module 210 may train the prediction model 250 to produce an output that indicates which node in the graph corresponds to a particular category (e.g., a particular label, a particular data type, etc.) and/or a probability (e.g., a percentage) that a particular node corresponds to the particular category. In one example, the category may correspond to a tracking number used by a shipping courier. Thus, the data extraction manager 202 may use images of historic shipment labels (where locations of the tracking numbers have been identified) to train the prediction model 250. To train the prediction model 250, the model configuration module 210 may identify characters within each training image and determine bounding boxes in each training image using the techniques disclosed herein. The model configuration module 210 may also generate a graph based on the bounding boxes in each training image, label the node in the graph that corresponds to the particular category (e.g., a tracking number), and provide the labeled graph to the prediction model 250.

After training the prediction model 250, the data extraction manager 202 may use the trained prediction model 250 to determine which corresponding node in the graph 500 corresponds to a bounding box that includes a tracking number in the image 300. In some embodiments, the data extraction manager 202 may use the output from the prediction model 250 to determine which node in the graph 500 corresponds to the particular category (e.g., a shipment tracking number). As discussed herein, the output of the prediction model 250 may be an identifier of a particular node (or identifiers or multiple nodes when multiple nodes correspond to the particular category) that is determined (e.g., predicted) to be associated with the particular category. The data extraction manager 202 may then locate the bounding box(es) in the image 300 that corresponds to the particular node. Alternatively, the output of the prediction model 250 may be a likelihood that one or more nodes are associated with the particular category. The data extraction manager 202 may then select the node(s) having the highest likelihood, and locate the bounding box(es) in the image 300 that corresponds to that node.

When multiple nodes are determined to be associated with the particular category (e.g., a tracking number category) based on the prediction model 250, the data extraction manager 202 may determine whether the bounding boxes corresponding to the multiple nodes are connected to each other (e.g., whether the bounding boxes are neighboring bounding boxes) and/or whether the distance(s) between the bounding boxes corresponding to the multiple nodes are below a particular threshold. If it is determined that the bounding boxes are connected to each other or the distances between the bounding boxes are within the particular threshold, the data extraction manager 202 may determine that the text within the bounding boxes are related to each other and correspond to the particular category. The data extraction manager 202 may then merge the text within the bounding boxes.

In this example, the prediction model 250 may produce an output that indicates that the nodes 518-522 are associated with tracking number. The data extraction manager 202 may determine that the corresponding bounding boxes 418-422 (or alternative the nodes 518-522) are connected to each other, and thus may determine that the text within the bounding boxes 418-422 are related to each other. The data extraction manager 202 may extract the text from the bounding boxes 418-422 ("7946," "7439," and "4345") and may merge the text from the bounding boxes 418-422 to form the tracking number "7946 7439 4345." In some embodiments, the data extraction manager 202 may also verify the extracted text "7946 7439 4345" using known patterns associated with the particular category (e.g., tracking numbers). The data extraction manager 202 may then provide the extracted texts in the form of a tracking number on a user device (e.g., the user device 110 of the user 140), via a communication protocol such as email, SMS messaging, etc.

In some embodiments, the data extraction manager 202 and/or other applications in the service provider server 130 may also determine shipment data of a shipment based on the extracted tracking number, by submitting a request to one of the remote servers 180 and 190. The shipment data may indicate a shipment method (e.g., 2-day air, ground), a status (e.g., on route, processed, delivered, etc.), an estimated arrival date, and other information. The data extraction manager 202 and/or other applications in the service provider server 130 may verify the shipment data based on data associated with the purchase transaction between the user 140 and the merchant of the merchant server 120. The data extraction manager 202 and/or other applications in the service provider server 130 may perform one or more actions based on whether the shipment data is verified. For example, when the shipment data does not comply with the requirements for the purchase transaction (e.g., late estimated arrival date, slower shipping method, etc.), the data extraction manager 202 and/or other applications in the service provider server 130 may initiate a dispute transaction for the purchase transaction and/or perform a refund to the user account of the user 140.

Figure 6:
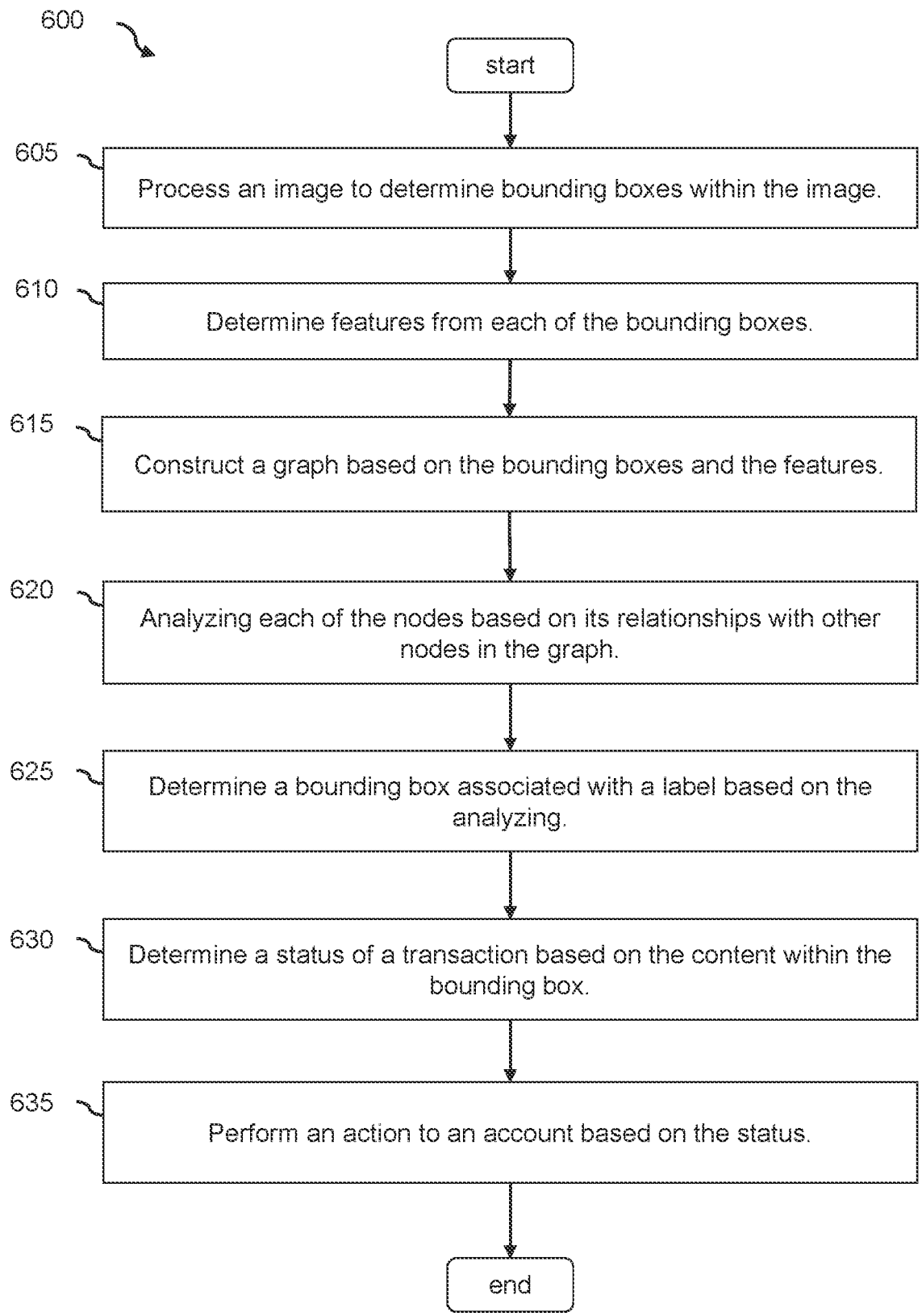
FIG. 6 is a flowchart showing a process of extracting data from an image according to an embodiment of the present disclosure.

FIG. 6 illustrates a process 600 for extracting data from an image according to various embodiments of the disclosure. In some embodiments, at least a portion of the process 600 may be performed by the data extraction module 132. The process 600 begins by processing (at step 605) an image to determine bounding boxes in the image. For example, the image processing module 204 may use one or more OCR techniques to identify characters in the image. The image processing module 204 may also translate any code (e.g., bar codes, QR codes) in the image into characters. The feature determination module 206 may then group the characters into different groups based on the characteristics of the characters.

The process 600 then determines (at step 610) features for each of the bounding boxes. For example, the feature determination module 206 may determine features for each of the bounding boxes 402-426 in the image 300. The features determined for each bounding box may include a location of the bounding box, a size of the bounding box, distances from adjacent bounding boxes, and characteristics of the text enclosed in the bounding box, such as a font size, a font type, a font color, a length, an alpha-numeric arrangement, etc.

Based on the bounding boxes and their features, the process 600 constructs (at step 615) a graph that models data in the image. For example, the graph generation module 208 may construct the graph 500 based on the bounding boxes 402-426 in the image 300. The graph 500 may include nodes 502-526 that correspond to the bounding boxes 402-426 and edges that represent the connections among the bounding boxes 402-426.

The process 600 then analyzes (at step 620) each of the nodes based on its relationships with other nodes in the graph and determines (at step 625) a bounding box associated with a label based on the analyzing. For example, the data manager 202 may analyze the graph 500. In some embodiments, the data manager 202 may analyze the structure of the graph and how each node is connected to other nodes in the graph. In some embodiments, the data manager 202 may use the prediction model 250, which may be implemented as a graph neural network, to predict one or more nodes (e.g., the nodes 518-522) that correspond to the particular category (e.g., a tracking number). The data manager 202 may then determine one or more bounding boxes (e.g., the bounding boxes 418-422) corresponding to the nodes.

The process 600 determines (at step 630) a status of a transaction based on the content of the bounding box and performs (at step 635) an action to an account based on the status. For example, the data manager 202 may extract a tracking number from the bounding boxes 418-422. The data manager 202 may determine a courier (e.g., FedEx®, UPS®, etc.) based on a format of the tracking number (or based on information provided by the merchant server 120), and may then submit a data request to one of the remote servers 180 and 190 corresponding to the courier. The data manager 202 may receive shipment data of a shipment as a response to the data request. The shipment data may indicate a shipment method, a shipment status, an estimated arrival date, among other information of the shipment. The data manager 202 may perform an action based on the shipment data, such as notifying the user 140 and/or the merchant, and/or initiating a dispute transaction for the purchase transaction or a refund transaction when the shipment data does not comply with the requirements of the purchase transaction.

It is noted that even though the examples described herein illustrate the use of the data extraction techniques to extract a tracking number from an image of a shipping label, the data extraction techniques can also be applied for extracting other types of data from images, especially in images that include a number of different types of text. For example, the data extraction techniques can be used to extract different types of information from images of an official document such as a passport of a driver's license. Since the format of an identification number (e.g., a passport number, a driver's license number) can vary greatly across different jurisdictions such as countries, states, cities, etc. (e.g., have different lengths and alpha-numeric arrangements) and the official documents usually contain many different types of text, it can be difficult to identify the identification number within an image of the document based on pattern-matching alone. Thus, the data extraction techniques can be used to identify the portion of the image where the identification number is likely to be located based on analyzing a graph that models the different types of data on the image.

Figure 7:
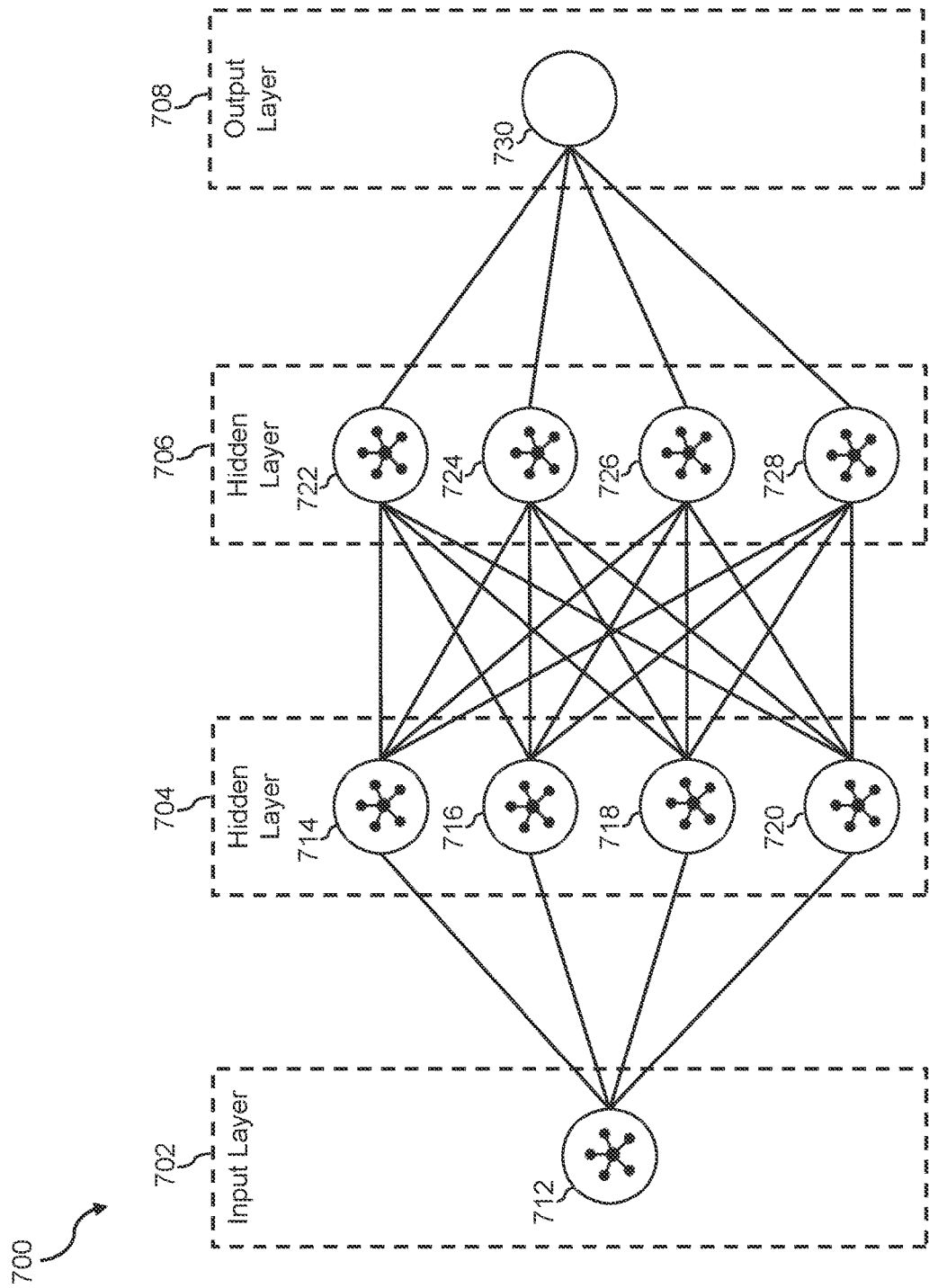
FIG. 7 illustrates an exemplary graph neural network according to an embodiment of the present disclosure.

FIG. 7 illustrates an example graph neural network 700 that may be used to implement the prediction model 250. As shown, the graph neural network 700 includes four layers—an input layer 702, two hidden layers 704 and 706, and an output layer 708. Each of the layers 702-708 may include one or more nodes. For example, the input layer 602 includes a node 712, the hidden layer 704 (a first hidden layer) includes nodes 714-720, the hidden layer 706 (a second hidden layer) includes nodes 722-728, and the output layer 708 includes a node 730. In this example, each node in a layer is connected to every node in an adjacent layer. For example, the node 712 in the input layer 702 is connected to all of the nodes 714-720 in the hidden layer 704. Similarly, each node in the hidden layer 704 is connected to all of the nodes 722-728 in the hidden layer 706. Each of the nodes 722-728 in the hidden layer 706 is connected to the node 730 in the output layer 708. Although the graph neural network 700 is shown to include two hidden layers, it has been contemplated that the graph neural network 700 used to implement the prediction module 250 may include as few (e.g., 1) or as many hidden layers (e.g., 50, 80, etc.) as necessary.

In this example, the graph neural network 700 receives a graph (e.g., attributes of the graph nodes and graph edges) as an input in the node 712, and produces an output value at the node 730. In some embodiments, each of the nodes 714-720 in the hidden layer 704 mutates the attributes in a graph node based on other graph nodes that are directly connected to the graph node. The mutation may be based on a mathematical computation (or algorithm) that produces a value based on the input values corresponding to the attributes of the graph node. The mathematical computation may include assigning different weights to each attribute in the graph node. In some embodiments, the weights that are initially used by each of the nodes 714-720 may be randomly generated (e.g., using a computer randomizer). The mutations generated by the nodes 714-720 may be used by the nodes 722-728 in the second hidden layer 706 to further mutate the graph nodes in the graph.

Similar to the first hidden layer 704, each of the nodes 722-728 in the second hidden layer 706 mutates the attributes in a graph node, except that the mutations are based on graph nodes that are farther away from the graph node (e.g., 2 degrees of separation) in the graph. As such, in some embodiments, the graph neural network 700 may include sufficient hidden layers (e.g., 5, 10, etc.) such that all of the other graph nodes in the graph can contribute to the mutations of each graph node in the graph through the hidden layers of the graph neural network 700. The node 730 in the output layer 708 may use all of the mutations of the graph nodes generated by the hidden layers to provide an output. In this example, the output node may be configured to provide an identifier of a graph node in the graph that has the highest likelihood of being associated with a particular data category (e.g., a tracking number).

The graph neural network 700 may be trained by using training data (e.g., labeled graphs). For example, a graph having a graph node that is labeled as being associated with the particular data category can be used as a training graph. In some embodiments, a training graph can be generated by historic images (e.g., images of historic shipping labels). Bounding boxes can be generated on a historic image using the techniques described herein, and a graph that models the data in the image can be generated based on the bounding boxes. A node that corresponds to the bounding box that encloses the data of the particular data type can be labeled. The labeled graph can then be used as a training graph for training the graph neural network 700. By providing training data (multiple training graphs) to the graph neural network 700, the nodes 714-728 in the hidden layers 704 and 706 may be trained (the mutations are adjusted) such that an optimal output (e.g., a node identification) is produced in the output layer 708 based on the training data. By continuously providing different sets of training data, and penalizing the graph neural network 700 when the output of the graph neural network 700 is incorrect (e.g., when the output node does not match the labeled graph node in the graph), the graph neural network 700 (and specifically, the hidden layers 704 and 706) may be trained (adjusted) to improve its performance in predicting a node (e.g., bounding box) associated with the particular category. Adjusting the artificial neural network 700 may include adjusting the weights associated with the attributes of the nodes in the graph and/or adjusting the mutations to the nodes in the graph.

FIG. 8 is a block diagram of a computer system 800 suitable for implementing one or more embodiments of the present disclosure, including the service provider server 130, the merchant server 120, the remote servers 180 and 190, and the user device 110. In various implementations, the user device 110 may include a mobile cellular phone, personal computer (PC), laptop, wearable computing device, etc. adapted for wireless communication, and each of the service provider server 130, the merchant server 120, and the remote servers 180 and 190 may include a network computing device, such as a server. Thus, it should be appreciated that the devices 110, 120, 130, 180, and 190 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via a network 822, such as network 160 of FIG. 1. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid-state drive, a hard drive). The computer system 800 performs specific operations by the processor 814 and other components by executing one or more sequences of instructions contained in the system memory component 810. For example, the processor 814 can perform the data extraction functionalities described herein according to the process 600.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
deriving text data from an image;
determining, from the image, a plurality of text groups in the image based on text characteristics of the text data;
constructing a graph comprising a plurality of nodes and a plurality of edges based on features determined for each of the plurality of text groups in the image, wherein the constructing comprises generating a node for each text group in the plurality of text groups and generating an edge between a pair of nodes based on locations of a corresponding pair of text groups in the image;
determining, from the plurality of text groups in the image, a particular text group corresponding to a particular data category by providing attributes of the graph as inputs to a graph neural network; and
performing an action in association with a user account based on a text extracted from the particular text group.

2. The system of claim 1, wherein the performing the action comprises transmitting the text to a server via a network.

3. The system of claim 2, wherein the image is obtained in association with a request received from a user device, and wherein the operations further comprise:
receiving, from the server, information based on the text; and
transmitting a response to the user device based on the information.

4. The system of claim 1, wherein the features determined for each text group comprises at least one of a location of the text group within the image, a size of the text group, and text attributes associated with the text group.

5. The system of claim 1, wherein the text characteristics comprise at least one of an alpha-numeric arrangement, a text spacing, a font, or an orientation of characters.

6. The system of claim 1, wherein the deriving the text data comprises:
detecting a code within the image; and
extracting text information from the code using one or more decoding algorithms.

7. The system of claim 1, wherein the deriving the text data comprises applying one or more optical character recognition algorithms on the image.

8. A method comprising:
deriving, by a computer system, text data from an image;
determining, from the image, a plurality of bounding boxes corresponding to a plurality of distinct text groups in the image based on text characteristics of the text data;
constructing, by the computer system, a graph comprising a plurality of nodes and a plurality of edges based on features determined for each of the plurality of bounding boxes in the image, wherein the constructing comprises generating a node for each text group in the plurality of bounding boxes and generating an edge between a pair of nodes based on locations of a corresponding pair of bounding boxes in the image;
analyzing the graph using a graph neural network;
determining, from the plurality of bounding boxes in the image, a particular bounding box corresponding to a particular data category based on the analyzing; and
performing, by the computer system, an action in association with a user account based on a text extracted from the particular bounding box.

9. The method of claim 8, wherein the plurality of bounding boxes corresponds to a plurality of different data categories.

10. The method of claim 8, further comprising:
verifying that the text extracted from the particular bounding box is in a text format corresponding to the particular data category.

11. The method of claim 8, further comprising:
determining first text characteristics associated with a first portion of the text data;
determining second text characteristics associated with a second portion of the text data; and
assigning the first and second portions of the text data to different text groups in the plurality of distinct text groups based on a difference between the first text characteristics and the second text characteristics.

12. The method of claim 8, wherein the analyzing the graph comprises providing attributes associated with the graph to the graph neural network.

13. The method of claim 8, wherein each bounding box in the plurality of bounding boxes encloses a corresponding portion of the text data in the image.

14. The method of claim 8, further comprising:
detecting a code within the image; and
extracting text information from the code using one or more decoding algorithms.

15. A non-transitory machine-readable medium having stored thereon machine-readable instructions executable to cause a machine to perform operations comprising:
deriving text data from an image;
determining, from the image, a plurality of text groups in the image based on text characteristics associated with different portions of the text data;
constructing a graph comprising a plurality of nodes and a plurality of edges based on features determined for each of the plurality of text groups in the image, wherein the constructing comprises generating a node for each text group in the plurality of text groups and generating an edge between a pair of nodes based on locations of a corresponding pair of text groups in the image;
analyzing the graph using a machine learning model;
determining, from the plurality of text groups in the image, a particular text group corresponding to a particular data category based on the analyzing; and
performing an action in association with a user account based on a text extracted from the particular text group.

16. The non-transitory machine-readable medium of claim 15, wherein the operations further comprise verifying that an alpha-numeric arrangement associated with the text extracted from the particular text group corresponds to the particular data category.

17. The non-transitory machine-readable medium of claim 15, wherein the performing the action comprises transmitting the text to a server via a network.

18. The non-transitory machine-readable medium of claim 17, wherein the image is obtained in association with a request received from a user device, and wherein the operations further comprise:
- receiving, from the server, information based on the text; and
- transmitting a response to the user device based on the information.

19. The non-transitory machine-readable medium of claim 15, wherein the features determined for each text group comprises at least one of a location of the text group within the image, a size of the text group, and text attributes associated with the text group.

20. The non-transitory machine-readable medium of claim 15, wherein the operations further comprise:
- determining first text characteristics associated with a first portion of the text data;
- determining second text characteristics associated with a second portion of the text data; and
- assigning the first and second portions of the text data to different text groups in the plurality of text groups based on a difference between the first text characteristics and the second text characteristics.

* * * * *